United States Patent
Barner et al.

(10) Patent No.: US 6,870,548 B2
(45) Date of Patent: Mar. 22, 2005

(54) METHOD FOR MODIFYING THE DESIGN OF A STRUCTURAL PART

(75) Inventors: Johannes Barner, Munich (DE); Carsten Subel, Berlin (DE)

(73) Assignee: MTU Aero Engines GmbH, Munich (DE)

(*) Notice: Subject to any disclaimer, the term of this patent is extended or adjusted under 35 U.S.C. 154(b) by 69 days.

(21) Appl. No.: 10/363,553

(22) PCT Filed: Sep. 4, 2001

(86) PCT No.: PCT/DE01/03350

§ 371 (c)(1),
(2), (4) Date: Jul. 22, 2003

(87) PCT Pub. No.: WO02/23457

PCT Pub. Date: Mar. 21, 2002

(65) Prior Publication Data

US 2004/0004624 A1 Jan. 8, 2004

(30) Foreign Application Priority Data

| Sep. 5, 2000 | (DE) | 100 43 737 |
| Sep. 5, 2000 | (EP) | 00119201 |
| Sep. 6, 2000 | (DE) | 100 44 036 |

(51) Int. Cl.$^7$ .................................................. G09G 5/00
(52) U.S. Cl. ...................... 345/619; 345/643; 345/420; 345/581; 345/586
(58) Field of Search ............................... 345/418–421, 345/427–428, 581, 586, 619, 643, 610, 606

(56) References Cited

U.S. PATENT DOCUMENTS

| 4,618,924 A | 10/1986 | Hinds |
| 4,821,214 A | 4/1989 | Sederberg |
| 5,644,688 A | 7/1997 | Leon et al. |
| 6,792,398 B1 * | 9/2004 | Handley et al. ............... 703/2 |
| 2002/0123812 A1 * | 9/2002 | Jayaram et al. ............... 700/98 |
| 2003/0128208 A1 * | 7/2003 | Shih et al. .................. 345/419 |

FOREIGN PATENT DOCUMENTS

| EP | 0 241 071 | 10/1987 |
| EP | 0 280 968 | 9/1988 |
| GB | 2 190 268 | 11/1987 |

OTHER PUBLICATIONS

"Set Models and Boolean Operations for Solids and Assemblies," IEEE Computer Graphics and Applicatoins, IEE Inc., Nov. 1, 1990, pp. 76–86.

* cited by examiner

*Primary Examiner*—Matthew C. Bella
*Assistant Examiner*—Wesner Sajous
(74) *Attorney, Agent, or Firm*—Crowell & Moring LLP

(57) ABSTRACT

A method for modifying the design of a component with regard to one or more criteria using a virtual model of the component, wherein a virtual model of the component is produced by combination of the component from basic objects with the aid of Boolean operators, and each basic object is assigned an information element in which attributes of the basic object are stored. Each basic object is decomposed into primitive objects which are combined with aid of Boolean operators, the primitive objects being surfaces or bodies which can be decomposed into rasters. Each geometrical contact surface is assigned a connecting element in which information for coordinating the objects is stored, and the rastering of the primitive objects is performed by a conventional gridding method. A modification of the geometrical shape of objects is undertaken with the information elements defining the limits of possible modifications.

9 Claims, 5 Drawing Sheets

● Corner point
⊗ New corner point
··· Connecting line

⊕ Corner point
⊗ New corner point
··· Connecting line

- ⊕ Corner point
- ⊗ New corner point
- --- Connecting line

METHOD FOR MODIFYING THE DESIGN OF A STRUCTURAL PART

BACKGROUND AND SUMMARY OF THE INVENTION

This application claims the priority of Application No. 100 43 737.0, filed Sep. 5, 2000 in Germany, and PCT DE01/03350, filed on Sep. 4, 2001.

The invention relates to a method for modifying, in particular for optimizing, the design of a component with regard to one or more criteria using a virtual model of the component.

The current development processes are developing from stepwise development towards simultaneous development, the disciplines of technical development and analysis being in closer cooperation, and knowledge of all relevant technical disciplines being introduced in early phases of product development. Simultaneous development is found to be necessary in order to develop products with improved technology and of higher quality in a shorter development time, something which also leads to reduced costs.

The probability of the development of better and less expensive components is rising in principle through the application of high performance analysis tools and the knowledge of experts in the various fields of engineering science. A possible impediment to success is, however, the normally limited time in which the components have to be developed.

With this in mind, the multidisciplinary design optimization (MDO) is regarded as an effective method for improving quality and performance of products in conjunction with reducing costs. This happens chiefly through shortening the evaluation time required overall for a design cycle, and by creating an automated analysis tool which searches for the best solution or performs specific tasks in a limited time.

Various publications provide a good overview of the state of the art in multidisciplinary design optimization. To name only a few, there are the articles by Alexandrov edit. [Natalia Alexandrov and M. Y. Hussaini, editors, Multidisciplinary Design Optimization—State of the Art, SIAM 1997], Bartholomew [Peter Bartholomew, The role of MDO within aerospace design and progress towards an MDO capability; in 7th AIAA/USA/NASA/ISSIMO Symposium on Multidisciplinary Analysis and Optimization, p. 2157–2165; AIAA, 1998], Kroo [Ilan Kroo; Mdo for large-scale design; in Natalia M. Aleandrov and M. Y. Hussaini, editors, Multidisciplinary Design Optimization—State of the Art, pages 22–44; SIAM, 1997], Sobieski and Haftka [Jaroslaw Sobieszczanski-Sobieski and Raphael T. Haftka; Multidisciplinary aerospace design optimization: Survey of recent developments, Conference Paper 96-0711, AIAA, 1996. Presented at the 34th Aerospace Sciences Meeting and Exhibit; Jan. 15–18, 1996] and Vanderplaats [G. N. Vanderplaats; Structural design optimization status and direction; Journal of Aircraft, 36(1):11–20, January–February 1999].

Sobieski and Haftka distinguish between three categories of multidisciplinary design optimization, which place different requirements on EDP and organization.

The first category comprises only a few technical disciplines. An expert can process all the required information and all necessary knowledge.

The second category comprises all methods which achieve the multidisciplinary object, all the required technical disciplines being introduced at a low degree of complexity. This optimization method is mostly applied to the design concept of a system, the analysis tools being used as individual modules. If these methods are, applied to tasks in the continuing design process, they are confronted with some of the organizational challenges set by multidisciplinary design optimization.

The third category is described as a stage of the challenge in terms of computing and organization. In order to permit the analysis in a modular environment, specific techniques, for example, decomposition, approximation and comprehensive sensor technologies are used as tools in order to organize the modules themselves and the exchange of data.

Similar classifications are proposed in other publications, for example by Bartholomew and Kroo. They distinguish between the various degrees of complexity and accuracy of the applied analysis programs and the optimization architecture.

The publications described above lead to a modular analysis environment, something which necessitates the use of decomposition and approximation techniques in order to be able to solve relatively complex design tasks. Kroo explains the necessity to develop the parameterized geometry at different degrees of detail and abstraction in order to be able to apply the multidisciplinary optimization to realistic, large-scale design tasks which comprise many disciplines and analysis tools from the state of the art.

In order to permit the fully automated design optimization with the use of a parameterized geometry at different degrees of detail, the geometry modelling must be more strongly linked to the rastering. Samareh [Jamshid A. Samareh; Status and future of geometry modelling and grid generation for design and optimization; Journal of Aircraft, 36(1):97–104, January–February 1999] compiles an overview of the requirements to be fulfilled and the problems to be solved in order to create such a fully automated geometry model and a rastering method for multidisciplinary optimization applications.

Another aspect of multidisciplinary design optimization is discussed by Wood and Bauer in [Richard M. Wood and Steven X. S. Bauer; A discussion of knowledge based design; Conference Paper 98-4944, AIAA, 1998; Presented at the 7th AIAA/USAF/NASA/ISSMO Symposium on Multidisciplinary Analysis and Optimization; Sep. 2–4, 1998]. Wood and Bauer point out the need to allow expert knowledge to flow into the optimization process in order to improve the technology and quality of the products. They say that knowledge from previous design cycles must flow into the early phase of the design process.

None of the solutions known from the prior art permits a completely automated design optimization.

It is an object of the present invention to propose a completely automated method for multidisciplinary design optimization of the two-, quasi- three- or three-dimensional component which permits small-scale changes to be transferred to the complete component.

The inventive method can be used to modify a component, in particular to optimize it, by applying modifications to different stages of details of the component. The first stage is to create a virtual model of the component. For this purpose, the component is combined from basic objects with the aid of solid modelling Boolean operators, the basic objects being, in particular, surfaces or rotationally symmetrical bodies. Each of the basic objects is assigned an information element in which the attributes of the respective basic object, in particular parameter values, interval limits and rules, are stored. These attributes determine and delimit the respective basic object.

It has hereby become possible to render accessible to multidisciplinary design optimization geometries and/or basic objects to which knowledge and/or information is allocated.

Each basic object is then constructed from further basic objects or one or more primitive objects which are combined with the aid of Boolean operators. The primitive objects are surfaces or bodies of different complexity and geometrical multiplicity which can be decomposed into rasters. Each further basic object or primitive object can again be assigned an information element in which the attributes of the further basic object or the primitive object, in particular parameter values, interval limits and rules, can be stored. These attributes determine and delimit the respective primitive object.

The Boolean combination of the component from individual basic objects yields geometrical contact surfaces or contact lines between two or more objects. The same also holds for the primitive objects. Each of these geometrical contact surfaces and contact lines is assigned a connecting element in which information for coordinating the objects is stored.

These so-called connecting or coordination elements can also be allocated as additional knowledge to each basic object or primitive object in order to obtain a better subdivision into rasterable surfaces in the further process.

The primitive objects are rastered in the next step, specifically by a conventional griding method.

The modification of the component can be undertaken subsequently. This is performed by modifying individual or a group of objects, the information of the information elements defining the limits of possible modifications, the connecting elements defining the coordination of the objects. Customary raster techniques are applied in this case.

The proposed model is a feature-based geometry model which permits multidisciplinary optimization in different degrees of detail. It uses an object-oriented access in order to produce the geometry and to integrate all the information required during the design process. The geometry at different degrees of detail permits starting with a two-dimensional geometry, then with rotationally symmetrical or stretched bodies, and finally with a realistic, three dimensional geometry.

The basic objects can be constructed from one or more further basic objects or primitive objects which can be combined by Boolean operators. Each basic object is again assigned an information element in this case, in which attributes of the basic object, in particular parameter values, interval limits and rules, are stored. Each geometrical contact surface or contact line which is produced in the case of the Boolean operation between two or more objects is assigned a connecting element in which information for coordinating the objects is stored.

The primitive objects can also be constructed from one or more further primitive objects, as a result of which it is possible to modify the degree of detail or the degree of construction of the model can be modified.

The primitive objects can, in turn, be combined by Boolean operators. They can be assigned in each case an information element in which attributes of the primitive object, in particular parameter values, interval limits and rules, are stored. Each geometrical contact surface or contact line which is produced in the case of the Boolean operation between two or more objects can be assigned a connecting element in which information for coordinating the objects is stored.

The modification of the geometrical shape is preferably performed exclusively or predominantly on the lowest object plane, that is to say the primitive objects, it being possible to raster the objects to be modified.

The inventive method proposed permits the multidisciplinary optimization of a component by modifying the degree of detail. Each technical discipline can start with the optimization at the stage optimum for it. The details of this design can be changed during the optimization process without the need for a complete change to the structure and topology of the previously designed geometry.

All the information required in later design steps can be taken from the information elements assigned to the individual objects, or be derived from the information. The information contained can be employed or passed to other tools.

The inventive modification method is preferably applied to optimize a component. It is preferably used after termination of the basic conception with a lower level of detail, and increases the variety of detail and the complexity of the topology as the process progresses.

The degree of the level of detail of the geometry of the model can be modified by changing the type of the primitive objects, by adding further objects to the preceding model, that is to say the latter is constructed from further basic objects and/or primitive objects.

A feature of the component can be represented by combining a primitive object with an information element which contains attributes of the object. These can be, in particular, parameter values, interval limits or rules. The rules reflect the knowledge of a person skilled in the art of the respective fields. It is thus therefore possible to define a feature of the component as a geometrical object which contains all the specific information which is required to determine and to delimit the geometry.

It is also possible to derive from the information stored in the information element further information and rules which are required in later design phases.

In order to render automated geometry modelling and rastering possible, it is desirable to maintain the principle features of each primitive object during the assembly of the topology of the overall component. The modelling technique is expanded for this purpose by creating additional curves or surfaces at the points at which objects are connected to one another or separated from one another.

These additional curves or surfaces are termed connecting elements. The connecting elements are used in order to decompose the geometry, which is constructed from rasterable constituents, into these rasterable constituents. These elements can both be produced automatically during the modelling with the aid of Boolean operators, and be allocated to each object as additional knowledge. It is then easy to produce a raster for the rasterable primitive objects.

Boolean operators produce an object which includes two or more primitive objects and one or more connecting elements between the primitive objects. Which type of object is selected for the primitive object depends on the degree of detail. With each further combination of objects, the degree of assembly and thus the degree of detail is increased.

Each connecting element includes curves or surfaces which cut the primitive objects such that they do not overlap, but meet precisely along this curve or surface. By using this technique, the topology of each primitive object can remain substantially the same during the optimization process. The production of the connecting elements corresponds to the customary raster methods, in which specific connecting conditions are determined for each object.

In another version of the inventive method, the Boolean operations are combined with an optional generation of intersection sets of neighbouring objects which are introduced into the connecting element. These intersection sets are created where the two objects intersect. The connecting elements then contain information on possible connecting surfaces or connecting lines between neighbouring objects. The connecting elements can then be positioned for the rastering such that they obey as well as possible the rules for producing rasters.

The primitive objects are preferably standardized, rasterable parts such as triangles, rectangles, pentagons, tetrahedra, pentahedra or hexahedra.

The primitive objects are preferably produced from surfaces or bodies which use lower geometrical objects, and which are combined with the aid of Boolean operators or by rotation, stitching or stretching. Primitive objects of the lowest degree of detail are objects such as circular or rectangular surfaces or bodies. The degree of detail grows through the use of objects such as B-spline curves or B-spline surfaces in order to describe the contours or surfaces. The degree of detail is characterized by the degree of the geometrical variety. If the number of the parameters rises, the objects become more general and the variety of geometrical shapes rises.

The resulting primitive objects are preferably standardized. They have the same input and output parameters, in order to permit a simple exchange between primitive objects of different degrees of detail.

An automated rastering is rendered possible by the assembly of rasterable primitive objects and the insertion of the connecting elements. The production of the connecting elements falls back on knowledge from the decomposition of geometry using the finite element method.

The actual rastering by a commercially available raster generator can be preceded by a preparatory step which makes available the data which are required by the raster generator.

Geometrical information such as, for example vertices, corners, surfaces, bodies, and specific raster information such as, for example, the number of elements, the type of the elements, the number of nodes, can be made available in the preparatory step. The entire geometry is decomposed at the connecting elements in the case of the method of rastering preferably used.

The result is individual surfaces for the production of a two-dimensional raster, or individual bodies for the production of a three-dimensional raster.

The advantage of the joining of geometrical modelling and rastering in one system is the high degree of accuracy in the geometry, which is then transferred to a commercially available raster generator. Processes such as the connection of edges which adjoin one another at their end points, the filtering out of corners which are shorter than a prescribed tolerance, or the closing of gaps between edges, can be carried out by using the information from the geometrical model.

Boolean operations which are applied during the production of the geometrical model can cause a change in the contours of the original primitive objects. The contour edges can be shortened, or new edges can be added. The recognition of which edges can be connected is thereby implemented. Both the raster surface or the raster body, and the edges of surfaces which belong to the sides of an element can be filtered out by means of this recognition.

In addition to this recognition process, it is possible to carry out other operations such as, for example, filtering and closing edges. All the information used for commercial raster generation can be derived from the objects recognized.

Additional information which is relevant for the production of rasters can be input in to the module or determined during the raster production.

The production of connecting curves between two objects is explained in more detail below with the aid of FIGS. 1 to 3:

FIGS. 1 to 3 show the production of connecting curves for surfaces. The method is the same for bodies, except that curves are used instead of points, and surfaces are used instead of curves in order to produce the connecting surfaces.

DETAILED DESCRIPTION OF THE DRAWINGS

The invention is explained in more detail below with the aid of a turbine wheel and with reference to FIGS. 4 to 7:

The development of the geometry begins with two-dimensional objects, applies rotation operators or stretch operators, and results in a realistic, three-dimensional rendition of the turbine wheel. It is possible in principle to use four-sided surfaces to describe a two-dimensional rendition of the rotor component. Two methods are used to parameterize the contours of these four-sided surfaces. The aim of this parameterization is to obtain a great variety of shapes while using as few parameters as possible.

Reference points or reference curves are used as input variables in both methods. The input variables are used as output geometries or final geometries and/or to position and orientate the primitive objects. These input variables are used in order to increase the accuracy when two objects are connected along a common curve. The differences between the two methods reside in the way in which the contours are produced. One type of primitive objects develops the contour by producing the contour curve directly (FIG. 4A). The second type produces the contour by defining a skeleton together with specification of a thickness distribution for developing the contour curve (FIG. 4B).

The feature-based geometrical model of a turbine wheel is applied to an integrally produced rotor stage of a high pressure compressor. The geometry firstly has a fictional contour and is not yet analysed or optimized.

Figure 1:
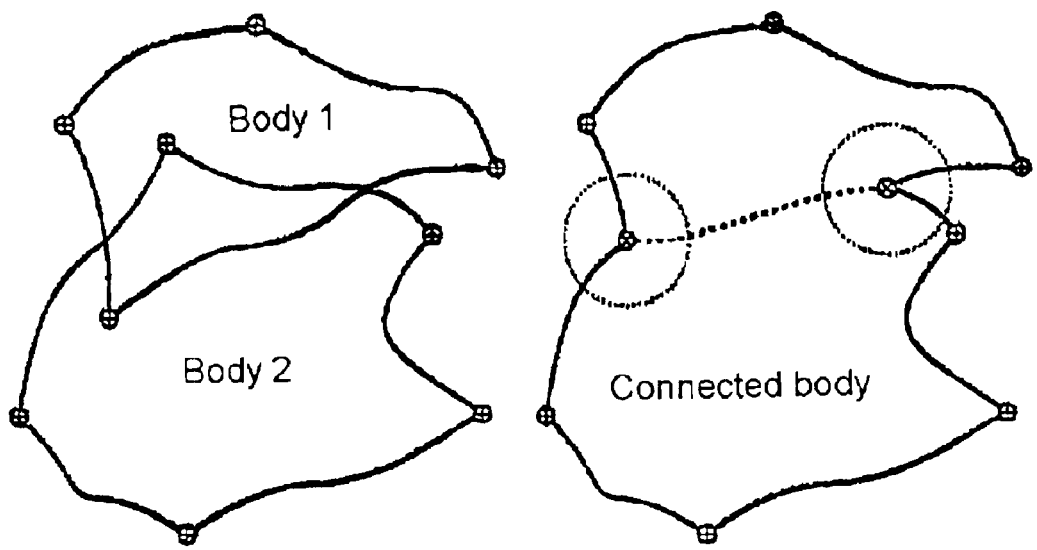
FIG. 1 shows the production of a connecting curve between two surfaces.
Figure 2:
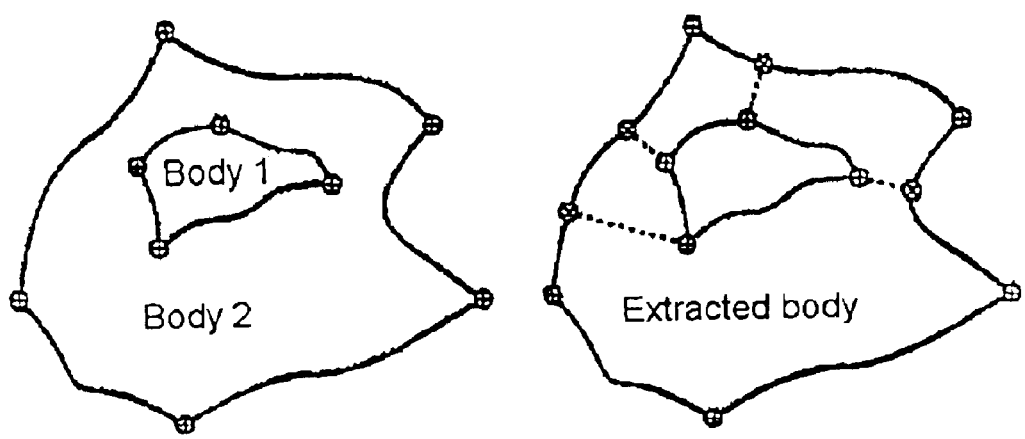
FIG. 2 shows a connecting curve between verticles or corners of the body if a body is entirely extracted from another body.
Figure 3:
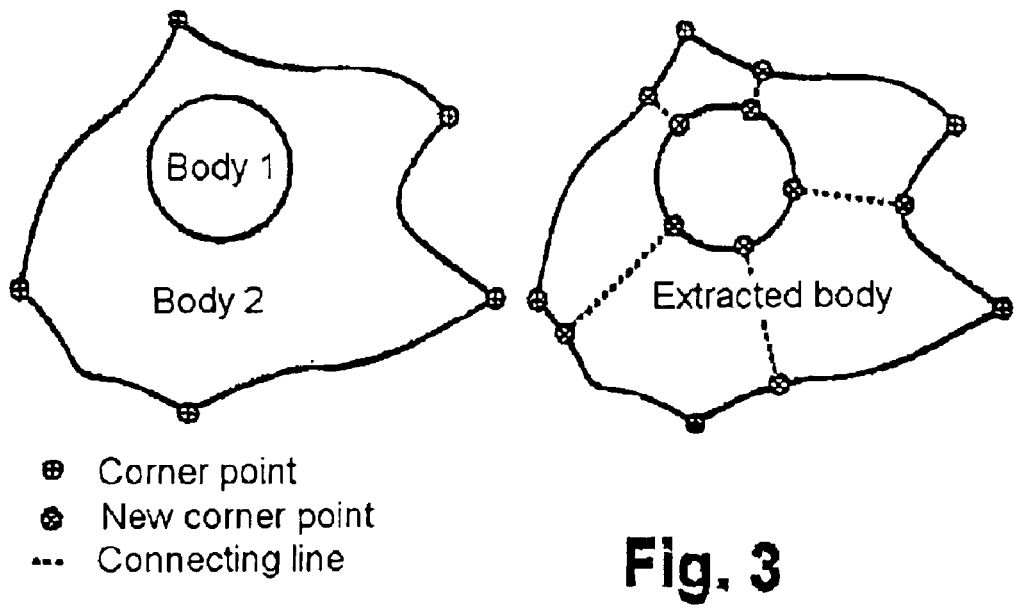
FIG. 3 shows a connecting curve developed between the two contours at the point with a minimum distance between opposite corners or surfaces when a body is entirely extracted from another body.
Figure 4:
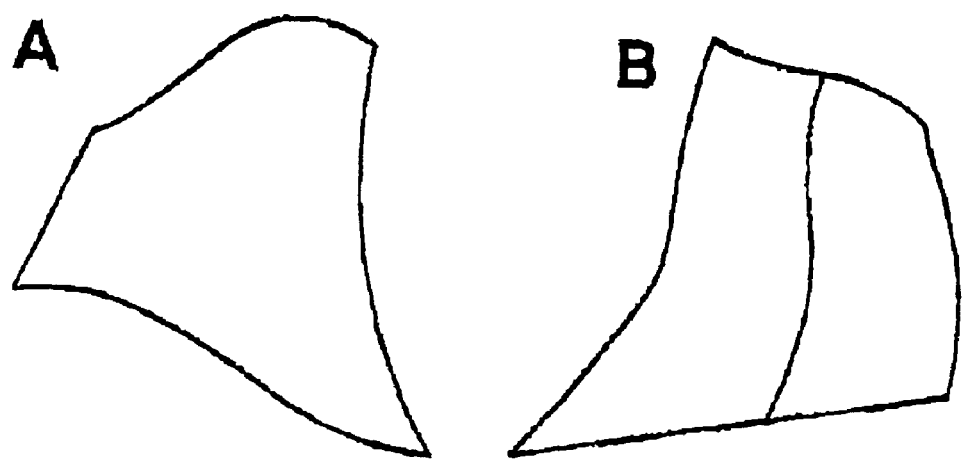
FIG. 4A shows a first method parameterizing contours.
FIG. 4B shows a second method of parameterizing contours.
Figure 5:
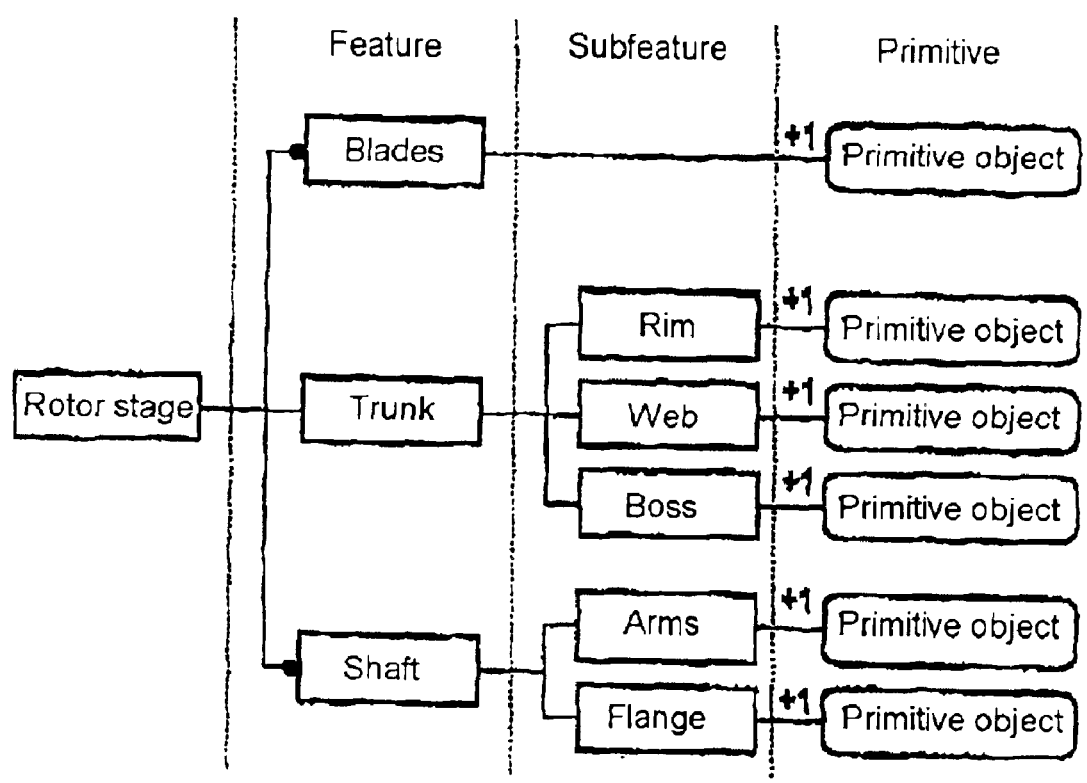
FIG. 5 shows an example of a decomposition of a turbine wheel.

A possible decomposition of a turbine wheel is illustrated in FIG. 5. The bold points mean that these basic objects are optional and include zero or more objects. The basic objects are blades, trunk and shaft. Each basic comprises one or more primitive objects of which different types can be present, and which can be exchanged without changing the structure of the design. For example, the flange is a basic object which can have various topologies such as, for example, a flange for welding or for assembly. If the type of this basic object is modified, this does not change the structure of the rotor disc, but only the topology.

Figure 6:
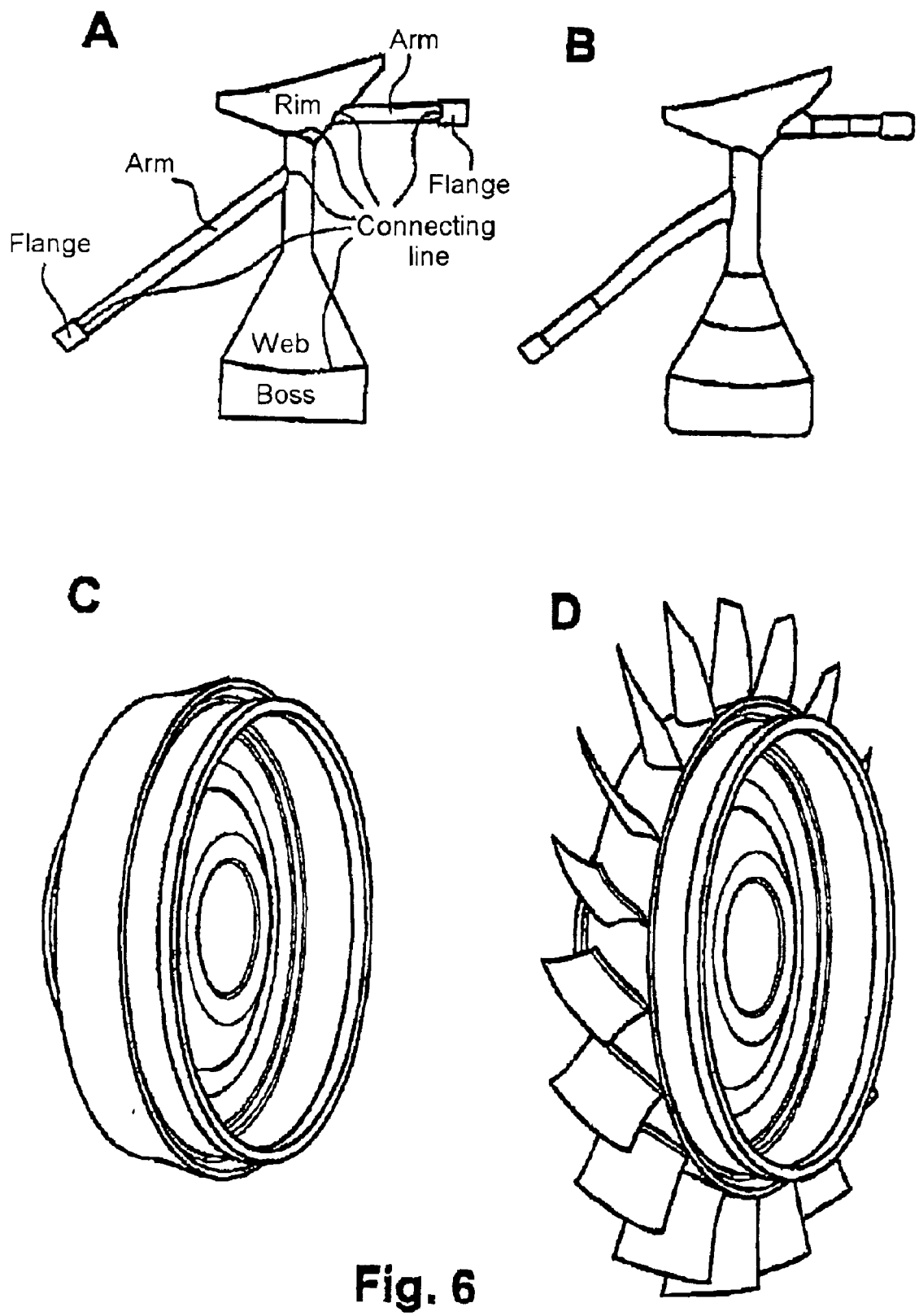
FIGS. 6A–6D illustrate the geometry of a rotor disc.

The geometry of the rotor disc is illustrated in FIG. 6 in various degrees of detail. The primitive objects are quadrangular objects which are connected in order to produce the contour depicted. The primitive objects illustrated in FIG. 4A are used for all the objects which illustrate the trunk and the flanges. The blades are produced using a type in accordance with FIG. 4B, the contours being described by a skeleton with a thickness distribution.

In general, optimization can begin with specific parts or with the complete geometry. This can be performed by considering only those parameter sets which influence these parts, or by considering all the parameters. Likewise, it is possible to carry out optimization using the different degrees of detail or assembly. For a primitive object, this degree can be modified with regard to a specific part of the geometry by modifying the details of the primitive objects or by modifying the degree of assembly of the basic object. Automatic rastering can be carried out on each stage, and analysis can be started.

The advantages of the assembly of the geometry and retaining the main characteristics of the primitive objects through the introduction of connecting elements are that a consistent raster can be maintained during the optimization and the change in the degree of detail or assembly.

Figure 7:
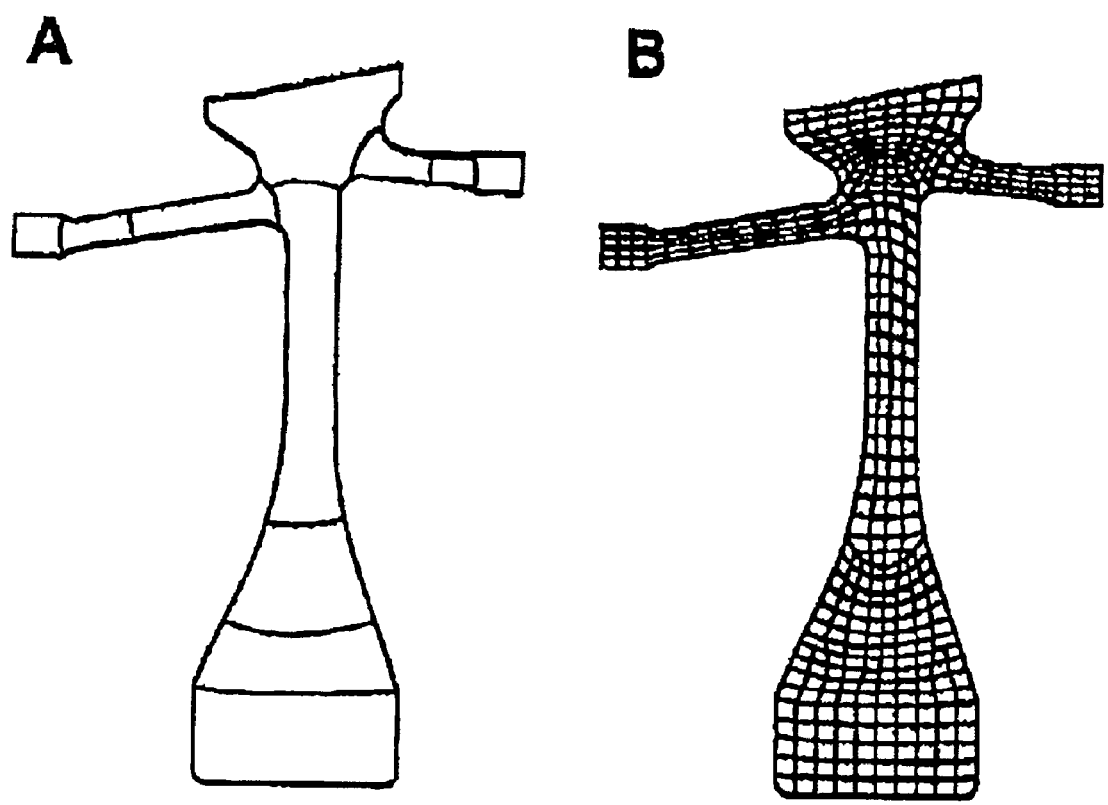
FIGS. 7A–7B show a finite raster produced for a rotor disc.

The finite element raster produced for a rotor disc is illustrated in FIG. 7. The raster remains substantially unmodified when the degree of detail or the position of primitive objects is modified, since these changes do not influence the main structure of the assembled geometry. When more objects are added and the degree of assembly rises, the preceding topology is changed to a minimum extent, and the preceding network can remain substantially unmodified. This may be seen at the transition between the (connecting) arms and the trunk. The main characteristics of the trunk are retained when two (connecting) arms are present or are added.

The foregoing disclosure has been set forth merely to illustrate the invention and is not intended to be limiting. Since modifications of the disclosed embodiments incorporating the spirit and substance of the invention may occur to persons skilled in the art, the invention should be constructed to include everything within the scope of the appended claims and equivalents thereof.

What is claimed is:

1. A method for modifying, in particular for optimizing, the design of a component with regard to one or more criteria using a virtual model of the component, said method comprising the steps of:

a) producing a virtual model of the component by combining the component from basic objects with the aid of Boolean operators, b) assigning each basic object is assigned an information element in which attributes of the basic object are stored, said attributes including parameter values, interval limits and rules, are stored, c) constructing each basic object from primitive objects which are combined with aid of Boolean operators, the primitive objects being surfaces or bodies which can be decomposed into rasters, d) assigning each geometrical contact surface or contact line, produced in the case of the Boolean operation between two or more objects, a connecting element in which information for coordinating the objects is stored, e) rastering of the primitive objects by a conventional gridding method, f) modifying a geometrical shape of individual or a group of objects is undertaken, wherein the information of the information elements define the limits of possible modifications.

2. Method according to claim 1, wherein the basic objects are constructed from one or more further basic objects which are combined by Boolean operators, and which are assigned in each case an information element in which attributes of the basic object, in particular parameter values, interval limits and rules, are stored, and each geometrical contact surface or contact line which is produced in the case of the Boolean operation between two or more objects being assigned a connecting element in which information for coordinating the objects is stored.

3. Method according to claim 1, wherein the primitive objects are constructed from one or more further primitive objects which are combined by Boolean operators, and which are assigned in each case an information element in which attributes of the primitive object, in particular parameter values, interval limits and rules, are stored, and each geometrical contact surface or contact line which is produced in the case of the Boolean operation between two or more objects being assigned a connecting element in which information for coordinating the objects is stored.

4. Method according to claim 3, wherein the basic objects or primitive objects are assembled with the aid of Boolean operators from lower geometrical objects which are produced by rotation, stitching or stretching.

5. Method according to claim 1, wherein only the geometrical shape of individual or a plurality of primitive objects is modified.

6. Method according to claim 1, wherein the primitive objects are standardized rasterable objects such as triangles, rectangles, pentagons, tetrahedra, pentahedra or hexahedra.

7. Method according to claim 1, wherein the basic objects are, in particular, surfaces, cuboids or rotationally symmetrical bodies.

8. Method according to claim 1, wherein each primitive object is assigned an information element in which attributes of the primitive object, in particular parameter values, interval limits and rules, are stored.

9. Method according to claim 1, wherein before the rastering of the primitive objects (step e), the objects are allocated coordination elements as additional knowledge.

* * * * *